(12) United States Patent
Vadura et al.

(10) Patent No.: US 9,420,057 B2
(45) Date of Patent: Aug. 16, 2016

(54) FEDERATED CACHE NETWORK

(71) Applicants: Dennis Vadura, Trabuco Canyon, CA (US); Wei Kang Tsai, Irvine, CA (US)

(72) Inventors: Dennis Vadura, Trabuco Canyon, CA (US); Wei Kang Tsai, Irvine, CA (US)

(73) Assignee: Badu Networks, Inc., Irvine, CA (US)

( * ) Notice: Subject to any disclaimer, the term of this patent is extended or adjusted under 35 U.S.C. 154(b) by 125 days.

(21) Appl. No.: 14/291,782

(22) Filed: May 30, 2014

(65) Prior Publication Data
US 2015/0350364 A1 Dec. 3, 2015

(51) Int. Cl.
*G06F 15/167* (2006.01)
*H04L 29/08* (2006.01)
*H04W 4/18* (2009.01)

(52) U.S. Cl.
CPC ........ *H04L 67/2842* (2013.01); *H04L 67/2885* (2013.01); *H04W 4/18* (2013.01)

(58) Field of Classification Search
CPC ................ H04L 67/2842; H04L 67/2885
USPC .......................................... 709/214
See application file for complete search history.

(56) References Cited

U.S. PATENT DOCUMENTS

| 7,512,702 | B1* | 3/2009 | Srivastava | ............... H04L 45/00 370/236 |
|---|---|---|---|---|
| 2007/0011272 | A1* | 1/2007 | Bakke | .................. G06F 9/5027 709/217 |
| 2010/0217869 | A1* | 8/2010 | Esteban | ............ G06F 17/30017 709/226 |
| 2012/0159558 | A1* | 6/2012 | Whyte | ................. H04N 21/222 725/95 |
| 2013/0046883 | A1* | 2/2013 | Lientz | ................. H04L 41/0816 709/224 |
| 2013/0318051 | A1* | 11/2013 | Kumar | ............. G06F 17/30156 707/692 |

* cited by examiner

*Primary Examiner* — Suraj Joshi
*Assistant Examiner* — Jaren M Means

(57) ABSTRACT

A system and method, called federated cache network (FCN), places and optimizes content caches located in an access or backhaul network of a network service provider or multiple system operator. A FCN comprises a trunk cache and a plurality of branch caches and leaf caches. In a mobile carrier network, the mobility management entity (MME) informs a TCP termination device that a mobile device is moving toward a new base station. The live and terminated TCP sessions associated with a mobile terminal that is moving to a new base station are copied and re-terminated at the new base station, in anticipation of a possible handoff.

6 Claims, 3 Drawing Sheets

FEDERATED CACHE NETWORK

CROSS REFERENCES TO RELATED APPLICATIONS

The present Application claims priority to U.S. Provisional Patent Application No. 61/828,685 filed on May 30, 2013, which is hereby incorporated by reference in its entirety.

FIELD OF THE INVENTION

The present invention relates in general, to method of cache optimization, and in particular, to cache placement and optimization in a backhaul or access network of a network service provider or a multiple-system operator.

BACKGROUND OF THE INVENTION

Today, caching is an integral part of the Internet infrastructure—it is extensively deployed for many different reasons. For example, caching is used to reduce bandwidth costs, share server costs, or increase response speed. There exist numerous caching technologies: browser caching, content distribution network, push caching, adaptive caching, active caching, streaming caches, etc.

Caching is important to network service providers (NSPs) and multiple-system operators (MSOs), which provide fixed or mobile broadband bandwidth to retail customers. For these providers, reducing customer churn rate is a major business driver. One way to reduce churn rate is to enhance user experience through caching.

Most NSPs and MSOs own a bandwidth infrastructure, which is both an asset and a liability—operating the infrastructure consumes working capital. As they have sunk significant capital in building up the infrastructure—it is to their advantage to leverage their existing infrastructure.

From the cost perspective, server and storage costs have dropped relative to bandwidth costs. The reason is that bandwidth costs are tied to the physical distance between a transmitter and a receiver. In contrast, the costs of computing and storage have decreased exponentially as the relevant technologies have made continuous improvements. However, the costs of laying cables and maintaining the ground lease for cell towers have actually risen over the years along with the general inflation.

Therefore, caching is a way to substitute the more expensive bandwidth resources with the less expensive computing and storage resources, while still improving the performance of content access in an average sense.

For NSPs, 2 user-experience metrics are important: (1) response speed of interactive applications, and (2) throughput of large-file applications. For interactive applications such as web browsing, the user is most concerned with the speed that a web page is rendered. For large-file applications such as video streaming, the user is most concerned with the speed that the video buffer is filled, which directly translates into the download throughput. Caching will help both types of application.

In the current solutions for web caching, cache nodes (devices that implement caching) are not placed in access or backhaul networks. Instead, cache nodes are placed in data centers or hub locations. The reason for doing this is that cache nodes are servers that need a protected environment. To expose a server in an outdoor environment, the server has to be ruggedized to withstand high temperature, rain, and other weather-related impacts.

However, as the server technologies have improved, it is now economical to place ruggedized cache nodes even in an outdoor setting such as the cell transmission tower of a mobile carrier, or the street cabinet (or local multiplexer) of a cable system operator. These outdoor locations are in the access or backhaul network of an NSP or MSO.

Placing cache nodes at such locations brings new technical challenges. For example, in a mobile carrier network, a user can move from one cell to the next. Once a user moves, the user device changes its network attachment point—the mobile carrier has to perform handoff by rerouting the packets to a different location. The handoff process breaks content caching at the cell towers as caching is tied to TCP (transmission control protocol) termination.

In TCP termination, packets destined for either the mobile device or the server must traverse the termination point. But once the mobile device changes its network attachment point, packets destined for either the mobile device or the server may not pass through the termination point anymore. The termination point has to be relocated. Preferably, the cache content associated with the mobile device is also relocated to the same place.

For MSOs and fixed-line NSPs, there are no mobility (handoff) issues. However, for all NSPs and MSOs, caches installed in access or backhaul network nodes are serving a highly restricted group of users; the cache content should be optimized with this in mind.

Therefore, there is a need to improve caching by moving cache nodes to the access or backhaul networks of NSPs and MSOs. The new type of cache nodes has to be optimized for handoff and serving a highly restricted group of users.

BRIEF SUMMARY OF THE INVENTION

A system and method, called FCN (federated cache network), places and optimizes cache nodes in an access or backhaul network of an NSP or MSO.

FCN caches in a backhaul or access network form a federated network—if a content object is not found in a local cache, the original content request is forwarded to an upstream cache, which is a cache on a path toward the core network of an MSO or NSP from the local cache. If the content object is not found an FCN, the content request is forwarded to an origin server.

In an FCN, there are 3 types of cache: trunk cache, branch cache, and leaf cache. The trunk cache has a capacity roughly equal to the sum of capacities of all directly connected (there is no $3^{rd}$ FCN cache between the path connecting the 2 caches) leaf and branch caches in the same FCN. A branch cache has a capacity roughly equal to the sum of capacities of all the directly connected downstream (in the direction toward the end user equipment) leaf and branch caches.

The cache nodes in an FCN form a tree topology with the trunk cache at the root. Each FCN has only one trunk cache. The trunk cache node is directly connected to a group of downstream branch or leaf cache nodes. A branch cache node is directly connected to a group of branch or leaf cache nodes, which are further downstream in the backhaul or access network. A leaf cache node is not connected to any downstream cache nodes.

The content of the trunk cache is roughly the aggregate of contents in all the directly connected downstream branch and leaf caches; the content of a branch cache is roughly the aggregate of contents in all the directly connected downstream leaf and branch caches.

The trunk cache node may be placed at the edge of the core network, or inside the core network of an MSO or NSP. A branch cache node may be located inside a backhaul or access network, at a concentrator or hub location. A leaf cache node may be located at a location close to end customer equipment.

In an FCN, TCP (transmission control protocol) termination must be used in conjunction with caching. TCP termination points are placed at a location with a cache node.

If an FCN is embedded in a mobile carrier network, the mobility management entity (MME) communicates with the FCN cache nodes and their associated TCP termination devices.

If a mobile device is moving away from a current base transmission station toward a new base transmission station, the MME of the mobile network informs the TCP termination device at the current base transmission station of the new base transmission station. All live and terminated TCP sessions associated with the mobile device are copied and re-terminated at the new base transmission station. A block of cache content that is associated with the mobile device is pushed to the cache node at the new base transmission station.

In an FCN, the technique of TCP flow-aggregation may be used to improve average throughput between 2 cache nodes. A "permanent" TCP session is used to aggregate all or a large portion of the TCP traffic between 2 cache nodes.

Optionally, jumbo frames are used for the TCP traffic between cache nodes in an FCN.

BRIEF DESCRIPTION OF THE DRAWINGS

The above and other objects and features in accordance with the present invention will become apparent from the following descriptions of embodiments in conjunction with the accompanying drawings, and in which.

DETAILED DESCRIPTION OF EXEMPLARY EMBODIMENTS

Figure 1:
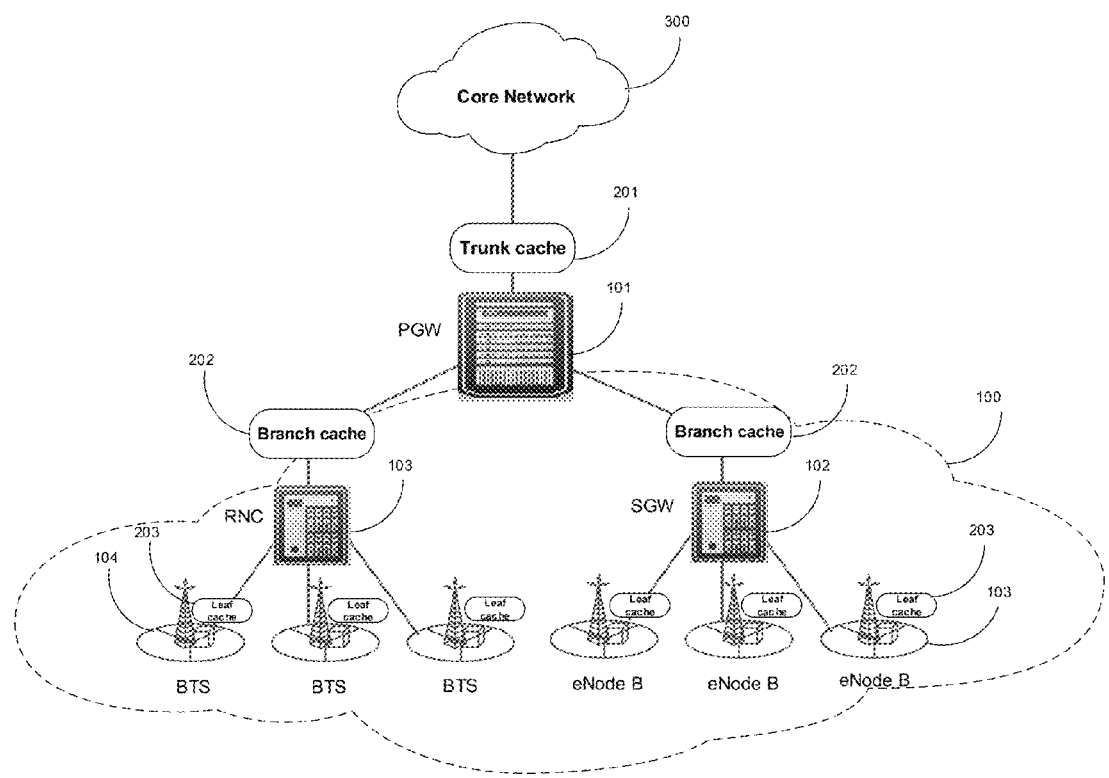
FIG. 1 depicts the topology of a federated cache network in a mobile carrier network.

A system and method, called FCN, places and optimizes cache nodes in an access or backhaul network of a NSP or an MSO, which provides fixed or mobile bandwidth to the Internet to retail customers.

The cache nodes in an FCN are semi-autonomous—each cache has an independent name-address space. The caches in an FCN are federated in the sense that, whenever a content object is not found in a local cache, the content request is forwarded to an upstream cache, which is a cache on a path toward the core network of an MSO or NSP from the local cache.

In an FCN, there are 3 types of cache nodes: trunk cache node, branch cache node, and leaf cache node. In an FCN, there is only one trunk cache, while there are a plurality of branch caches and leaf caches.

A difference between the 3 types of FCN cache is in their cache capacity. The trunk cache node has a capacity roughly equal to the sum of capacities of all directly connected (the path between the 2 caches does not go through a 3$^{rd}$ FCN cache) leaf and branch caches in the same FCN. A branch cache node has a capacity roughly equal to the sum of capacities of all the directly connected downstream leaf and branch cache nodes in the same FCN.

The cache nodes in an FCN form a tree topology with the trunk cache at the root. The trunk cache node is directly connected to a group of downstream branch and leaf cache nodes. A branch cache node is directly connected to a group of downstream branch and leaf caches. A leaf cache node is not connected with any downstream cache nodes.

Further, the cache content of the trunk node is roughly the aggregate of cache contents of all directly connected downstream branch and leaf caches; the cache content of a branch node is roughly the aggregate of cache contents of all directly connected downstream leaf and branch caches.

If a content object is not found at a cache node, the original content request is forwarded to a directly connected upstream (toward the core network) cache node—the upstream cache node may be a branch cache node or the trunk cache node. If the content object is not found at the trunk cache, the content request is forwarded to an origin server.

The trunk cache node may be placed at the edge of, or inside, the core network of an NSP or MSO. A branch cache node is located inside a backhaul or access network of an NSP or MSO, at a concentrator or hub location. A branch cache node may sit at a location that joins a number of branches in an access or backhaul network toward end user equipment. A leaf cache node may be located in a backhaul or access network that is close to the last piece of bandwidth to end customer equipment.

In a mobile carrier network, leaf cache nodes may be located at base transmission stations or access points; in a DSL (digital subscriber line) network, leaf cache nodes may be located at DSLAM (digital subscriber line access multiplexer) nodes; in an MSO network, leaf nodes may be located at street cabinets or local multiplexers.

In an FCN, the technique of TCP (transmission control protocol) termination must be used in conjunction with caching. TCP termination is also known as TCP splicing or TCP splitting. At a termination point, a cache node is made available. In an FCN, TCP termination points are usually placed at a location with a cache node.

If an FCN is implemented in a mobile carrier network, a technical hookup is set up so that the mobility management entity (MME) communicates with the FCN cache nodes and their associated TCP termination devices.

In a mobile network, a mobile device may move away from a current transmission station or access point to a new transmission station or access point. When and if such a movement takes place, the MME of the mobile network informs the TCP termination device at the current transmission station or access point that an associated mobile device is moving toward a new transmission station or access point. All live and terminated TCP sessions associated with the mobile device are copied and re-terminated at the new transmission station or access point, in anticipation of the actual handoff, if it does happen. In addition, a block of cache content that has been determined to be associated with the mobile device is pushed to the cache node at the new transmission station or access point.

In an FCN, the technique of TCP flow-aggregation may be used to improve throughput between 2 cache nodes. 2 cache nodes may communicate with each other—a cache can communicate with an upstream or downstream cache, or a cache may communicate with another cache that is neither upstream nor downstream. A "permanent" TCP session may be set up between 2 cache nodes. The "permanent" TCP session is then used to aggregate all or a large portion of the TCP traffic between the 2 cache nodes. Optionally, jumbo frames are used for the TCP traffic between cache nodes in an FCN.

For mobile carriers, an access network is often called a backhaul network. Sometimes, an access network for a metropolitan area is referred to as a metro network, and a core network is also known as a long-haul network. For a large operator, the core network is often connected with multiple access networks, and each access network is connected to the core through a gateway or hub.

In 3G (3$^{rd}$ generation) mobile networks, such a gateway is called a GGSN (gateway GPRS support node); in 4G (4$^{th}$ generation) networks, such a gateway is often called a PGW (packet gateway)—GPRS stands for general packet radio service. Both GGSN and PGW are used for a large service area—a gateway for a smaller service area is called a SGSN (serving GPRS support node) in 3G networks and a SGW (serving gateway) in 4G networks. For a large mobile carrier, the service area is further subdivided—a subdivision gateway is often called a RNC (radio network controller) in 3G networks. Finally, at the cell level, a base station is called a BTS (base transmission station) in 3G networks and an e-Node-B in 4G networks.

At the cell level, there are different types of cell: macro-, micro-, pico-, and femto-cell. Some base stations are wireless relays, while others are base stations, which are connected to the core network through a fixed broadband link. All the cell stations are candidates for placing an FCN cache. However, depending on the power supply and physical conditions, it may or may not be suitable to install a cache node.

If an NSP is a DSL (digital subscriber line) provider, cache nodes can be installed at a DSLAM (digital subscriber line access multiplexer) node, a central office node, or a core network node. If an NSP is a cable provider, cache nodes can be installed at the nation head end, a regional hub, a local multiplexer, or a street cabinet.

FIG. 1 depicts an embodiment of an FCN embedded in a 4G mobile carrier network. The trunk cache 201 is directly attached to PGW 101, which is connected to the core network 300. PGW 101 is connected to a SGW 102 and an RNC 103. The branch caches 202 are attached to SGW 102 and RNC 103. Both RNC 103 and SGW 102 are located in the access network 100. SGW 102 is connected to a number of eNodeB 103; RNC 103 is connected to a number of BTS 104. The leaf caches 203 are attached to either an eNodeB 103 or a BTS 104.

Figure 2:
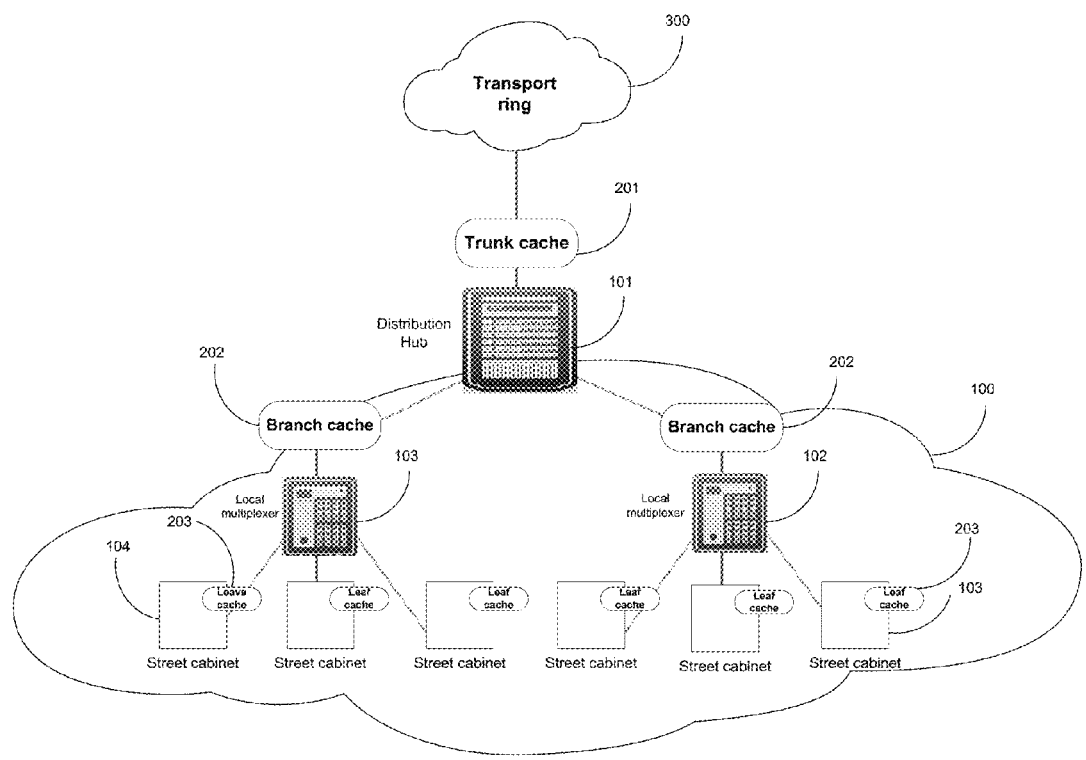
FIG. 2 depicts the topology of a federated cache network in an MSO network.

FIG. 2 depicts an embodiment of an FCN embedded in an MSO network. The trunk cache 201 is directly attached to a distribution hub 101, which is connected to the transport ring 300, which is equivalent to the core network in a mobile carrier. The distribution hub 101 is connected to 2 local multiplexers 102 and 103. The branch caches 202 are attached to the local multiplexers 102 and 103. Both local multiplexers 103 and 102 are located in the access network 100. The local multiplexers 102 and 103 are connected to a number of street cabinets 103 and 104. The leaf caches 203 are attached to a street cabinet 103 or 104.

Figure 3:
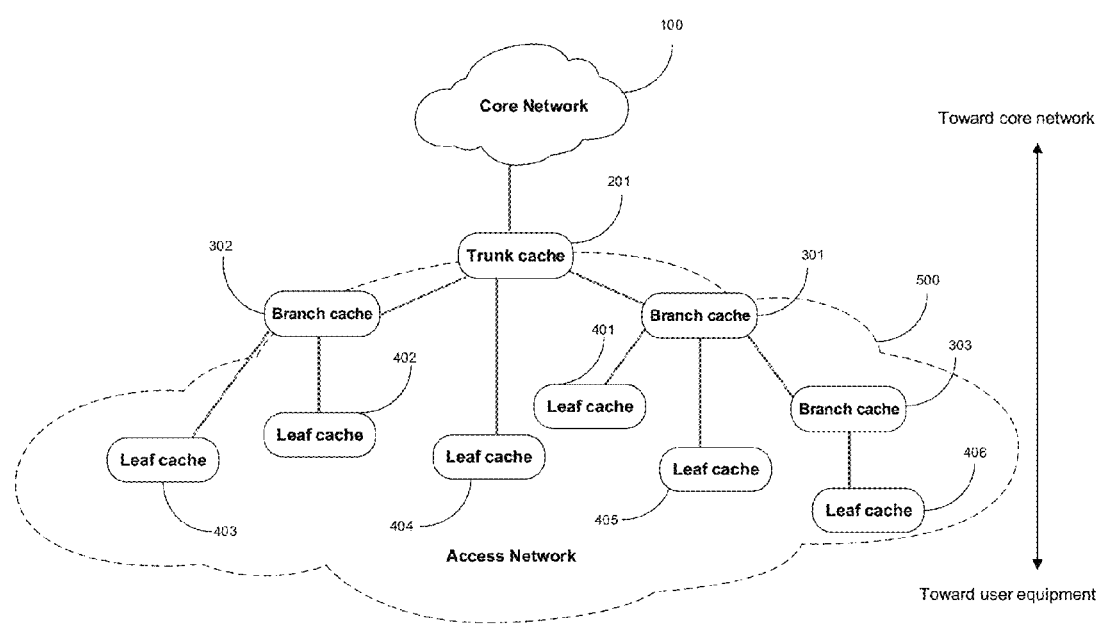
FIG. 3 illustrates the concepts of downstream, upstream, and direct connectedness.

FIG. 3 illustrates the concepts of upstream, downstream, and direct connectedness. The direction toward the core network 100 is upstream; the direction toward user equipment is downstream, which is opposite to the upstream. The dash cloud 500 represents the access network. The trunk cache 201 is directly connected to downstream branch caches 301 and 302 and a downstream leaf cache 404. Branch cache 301 is directly connected to downstream leaf caches 401, 405 and another downstream branch cache 303. Branch 301 is upstream of leaf cache 405.

What is claimed is:

1. A machine-implemented method, called federated cache network (FCN), to place content cache nodes in an access or backhaul network of a network service provider (NSP) or a multiple-system operator (MSO), for optimizing cache performance as cache nodes serving highly restricted groups of users, comprising placing a trunk cache at a gateway or hub between the core network and an access or backhaul network of an NSP or MSO, while the trunk cache node acting as the main cache of the FCN; placing a plurality of branch cache nodes downstream from the trunk cache toward the end users in the access network, while the branch cache nodes acting as the regional caches of the FCN; placing a plurality of leaf cache nodes further downstream from a branch node or the trunk node toward end-user equipment in the access network, while the leaf cache nodes acting as the local caches of the FCN; placing each cache node with a TCP (transmission control protocol) termination device, while TCP termination is also known as TCP splicing; wherein if a content object is not found in a local cache, the unmodified original content request is forwarded to an upstream cache, which is a cache on a path toward the core network of the MSO or NSP from the local cache; making the caches within the FCN to be available only to TCP connections which are spliced (or terminated) at the cache nodes.

2. The method of claim 1, wherein the technique of TCP aggregation is used to improve throughput between 2 cache nodes within the same FCN.

3. The method of claim 2, wherein a permanent TCP connection is set up to carry all or a large portion of TCP traffic between 2 FCN cache nodes.

4. The method of claim 2, wherein jumbo frames are used for TCP traffic between 2 FCN caches.

5. A machine-implemented method, called federated cache network (FCN), to place or relocate content cache objects in an access or backhaul network of a mobile carrier (MC), for optimizing cache performance as cache nodes serving highly restricted groups of users, comprising
    placing a trunk cache at a gateway or hub between the core network and an access or backhaul network of an MC, while the trunk cache node acting as the main cache of the FCN;
    placing a plurality of branch cache nodes downstream from the trunk cache toward the end users in the access network, while the branch cache nodes acting as the regional caches of the FCN;
    placing a plurality of leaf cache nodes further downstream from a branch node or the trunk node toward end-user equipment in the access network, while the leaf cache nodes acting as the local caches of the FCN;
    placing each cache node with a TCP termination device, while TCP termination is also known as TCP splicing;
    making the caches within the FCN to be available only to TCP connections which are spliced (or terminated) at the cache nodes;
    enabling technical hookup between the mobility management entity (MME) of the MC and the TCP termination devices, with their FCN cache nodes, so that the MME communicates with the FCN cache nodes and their TCP termination devices;
wherein when and if a mobile device, which is attached to a transmission station or access point, is moving toward a new transmission station or access point, all live and spliced TCP sessions associated with said mobile device are copied and re-terminated (re-spliced) at the new transmission station or access point, via the following steps:
    (1) the MME informs the TCP termination device at the current transmission station or access point of the new transmission station or access point;
    (2) all live and terminated TCP sessions associated with the mobile device are copied and re-terminated at the TCP termination device at the new transmission station or access point.

6. The method of claim 5, wherein when and if a mobile device is moving its attached transmission station or access point to a new transmission station or access point, a block of cache content associated with said mobile device is pushed to the FCN cache node at said new transmission station or access point.

\* \* \* \* \*